United States Patent Office 3,046,278
Patented July 24, 1962

---

3,046,278
PROCESS OF CYANATION
Wayne E. Feely, Rydal, Pa., assignor to Rohm & Haas Company, Philadelphia, Pa., a corporation of Delaware
No Drawing. Filed Oct. 24, 1960, Ser. No. 64,249
7 Claims. (Cl. 260—283)

This invention concerns a process for introducing cyano groups into aromatically unsaturated nitrogen-containing heterocyclic compounds in which the nitrogen is a member of a six-membered ring. More particularly, it concerns a process of cyanation in which the source of cyanide ion is the cyanide salt of an anion exchanger.

The preferred sources of cyanide ion disclosed in Serial No. 759,859 are the water- and lower alkanol-soluble alkali metal salts including ammonium cyanide. Using such soluble salts, a homogeneous reaction occurs since all of the reactants are soluble in the solvent. Because of this, isolation and purification of the products is more involved and time-consuming than it would otherwise be.

It has now been found that a heterogeneous reaction system can be employed if the source of cyanide ion is the cyanide salt of an anion exchanger. Such a system has, as one very real advantage, the ease of recovery of the product in a high degree of purity. A further advantage is that the use of the solid insoluble cyanide salt of an anion-exchanger makes possible column operation and, thus, a continuous process. Since the preferred process of cyanation requires exclusion of air or oxygen from the reaction mixture, this can be easily accomplished by using the column technique. A further advantage is the ease of control of reaction variables such as temperature, rate of addition of reactants, reaction time, etc.

The process of the present invention comprises preparation of the N-oxide of the nitrogen-containing heterocycle by treatment of it with $H_2O_2$, quaternization of the N-oxide by treatment with alkyl halides or dialkyl sulfates followed by the reaction of the resulting quaternary with the cyanide salt of an anion exchanger. The cyano-derivative so formed is isolated from the reaction mixture.

Suitable anion exchangers which can be used for the formation of the cyanide salts include weak base anion exchange resins. Weak base anion exchangers are well-known in the art and one class is represented by resins set forth in U.S. Patents Nos. 2,354,671; 2,356,151; and 2,402,384. They are prepared by the reaction of phenols with formaldehyde and a polyalkyleneamine. Another type of weak base resin is prepared as set forth in U.S. Patent No. 2,591,574, by reacting a halomethylated cross-linked copolymer with a primary or secondary amine. Still another type is prepared by the aminolysis of acrylate ester polymers with polyamines as set forth in U.S. Patent 2,675,359.

Particularly preferred are the strong base or quaternary anion exchangers, and typical of this class are the resins prepared by copolymerizing a monovinyl aromatic hydrocarbon and a polyvinyl aromatic hydrocarbon monomer, chloromethylating the resulting copolymer, and aminating the chloromethylated copolymer with a tertiary amine. Preparations of such anion exchangers are set forth in detail in U.S. Patents Nos. 2,591,573; 2,597,440; 2,629,-710; and 2,900,352; and the information therein is incorporated herein by reference.

Particularly preferred resins of this class are the anion exchangers prepared by copolymerizing styrene with divinylbenzene, employing 1% to 10% divinylbenzene, chloromethylating the resultant copolymer and aminating the chloromethylated copolymer with a trialkylamine. A particularly preferred trialkylamine is trimethylamine.

The cyanide salts of the anion exchangers are prepared, in the case of the weak base exchangers, by treatment of the free base, i.e. hydroxide form, of the exchanger with an aqueous solution of HCN. This reaction can be carried out batchwise, or a columnar procedure can be used. In the case of the strong base or quaternary anion exchanger, the preparation of the cyanide salt is appreciably simpler. The free base form of the anion exchanger can be treated with HCN or NaCN, or another salt form, e.g. the chloride salt, can be converted to the cyanide salt by treatment with an aqueous solution of an alkali metal cyanide. From an economic standpoint, NaCN is particularly suitable. The amount of cyanide ion available in any given sample of anion exchanger cyanide salt is easily determined by passing an excess of NaOH through the resin and determining the CN⁻ in the effluent.

The N-alkoxy quaternary ammonium salts of the nitrogen heterocycles employed in the present invention are prepared as follows: The N-oxide of the nitrogen heterocycle is prepared by treatment of the nitrogen heterocycle with hydrogen peroxide as set forth by Ochiai, J. Org. Chem. 18, 548 (1953). The N-oxide compound so produced is reacted with an alkyl salt to produce the N-alkoxy quaternary ammonium compound.

Alkyl salts which may be used for the preparation of the quaternary ammonium compounds include the alkyl halides, particularly bromides and iodides. However, the alkyl halides are expensive, and there are inherent experimental difficulties in preparing quaternary ammonium salts therefrom, including the use of solvents and the relatively low yields obtained. A preferred embodiment of this invention employs dialkyl sulfates as the alkyl salts. The lower dialkyl sulfates are readily available at low cost and react readily with the N-oxides to give quantitative yields of the N-alkoxy quaternary ammonium alkyl sulfates. However, higher alkyl sulfates, such as di-n-decyl sulfate, are also operable and give crystalline, high-melting quaternary salts which are water-soluble and react readily in aqueous solution with the cyanide ion.

Suitable nitrogen heterocycles include pyridine, quinoline, isoquinoline and substituted derivatives thereof, it being understood that the substituents do not interfere with the cyanation process. Thus, alkyl substituted nitrogen heterocycles react under essentially the same reaction conditions as the unsubstituted nitrogen heterocycles. The nitrogen heterocycles can be poly-substituted. Thus, the lutidines, i.e. the dimethylpyridines, can be used as set forth hereinafter. Similarly, other polyalkyl nitrogen heterocycles can be employed. Cyano-substituted nitrogen heterocycles may also be employed, thus producing polycyano substituted nitrogen heterocycles. Carbalkoxy substituted nitrogen heterocycles in which the alkoxy group contains one to four carbon atoms may also be used. Lower alkoxy and lower acyl substituted nitrogen heterocycles may also be employed as may nitrogen heterocycles with nitro or quaternary amino substituents. Combinations of these substituents on one molecule are also useful compounds. Thus, for example, a cyano-carbalkoxy substituted nitrogen heterocycle can be employed. Aryl substituted nitrogen heterocycles are also operable.

The position of the substituents in the ring is very important. In the pyridine series, one of the positions 2, 4 or 6 must be unsubstituted if the cyanation reaction is to occur. The other two positions may be substituted by any combination of the substituent groups hereinbefore described. The more electrophilic groups facilitate the cyanation reaction. One or both of the 3 and 5 positions may be substituted by the substituent groups hereinbefore described. Groups in the 3 and/or 5 positions have less influence on the course of the reaction than if they were in the 2, 4 or 6 positions, although in this case also electrophilic substituents will aid the cyanide ion addition. Alkoxy groups in any position in the pyridine ring will give rise to salts which are much less reactive than the corresponding alkyl derivatives. This is especially true if they are in the 2, 4 or 6 positions.

In the case of the substituted quinolines, either the 2 or the 4 position must be available for substitution. It has been found that if both the 2 and the 4 positions are available for substitution, the 2 position appears to be more readily substituted. Substituents in the 3 position and in the benzenoid ring will influence the ease of cyanation. Electron withdrawing groups will facilitate the addition reaction and electron donating groups will tend to inhibit the reaction. In addition to the substituents set forth hereinbefore, the substituted quinolines can have halogen or hydroxyl groups in any of the 3, 5, 6, 7 and 8 positions.

In the case of the substituted isoquinolines, the 1-position must be unsubstituted. In addition to the substituents set forth hereinbefore, the substituted isoquinolines may have halogen or hydroxyl groups in any of the 4, 5, 6, 7 and 8 positions.

Suitable compounds include pyridine, 3-methylpyridine, 4-methylpyridine, 2-methylpyridine, 2,6-dimethylpyridine, 2,4-dimethylpyridine, 5-ethyl-2-methylpyridine, 2-cyanopyridine, 3-cyanopyridine, 4-cyanopyridine, 2-cyano-6-methylpyridine, quinoline, 5,6-benzoquinoline, 9-acetyl-pyrido[2,3,b]indole, 2-methylquinoline, 2-butylquinoline, 4-cyano-2-butylpyridine, 2-cyanoquinoline, 2-cyano-6-octylpyridine, 4-cyanoquinoline, 3-butylisoquinoline, isoquinoline, ethyl nicotinate, ethyl isonicotinate, 3-carbethoxy-2,4-dimethylpyridine, 2-(3,4,5,6-pentamethylphenyl)-4-methylpyridine, 2-phenylpyridine, bipyridyl, 2,3-dicarbethoxypyridine, 2-ethylpyridine, 4-ethylpyridine, 2,3-dicarbmethoxypyridine, 2-benzylpyridine, 2-amylpyridine, 3,4-dicarbethoxypyridine, 3,5-dibutylpyridine, 3,5-dimethylpyridine, 2,3,4-trimethylpyridine, 4-carbethoxyquinoline, 1-methylisoquinoline, 1-propylisoquinoline, 6,7-benzoisoquinoline, 4-amylpyridine, 2-nonylpyridine, 4-nonyl-2-methylpyridine, 2-propylpyridine, 4-propylpyridine, 3-methylisoquinoline, and 4-ethyl-7,8-benzoquinoline.

The N-oxides of the nitrogen heterocycles are prepared by the stepwise addition of one mole of hydrogen peroxide, as a 35% aqueous solution, to one mole of the nitrogen heterocycle dissolved in glacial acetic acid. The temperature of the reaction mixture is maintained at about 70° C. to about 90° C. for about six hours. After removal of the acetic acid by vacuum distillation, water is added and the N-oxide distilled in vacuo.

The N-alkoxy quaternary ammonium salts of the nitrogen heterocycles are prepared by mixing the N-oxide derivative with an alkyl salt and heating. Preferred alkyl salts for this reaction are dialkyl sulfates and, although the higher dialkyl sulfates are equally as effective as the lower numbers of the series, the lower are preferred on an economic and availability basis. Thus, dimethyl sulfate is commonly employed. One mole of anhydrous N-oxide is added to one mole of dimethyl sulfate at such a rate that the temperature of the reaction mixture is maintained at about 50° to about 100° C. When addition is complete, the reaction mixture is maintained at the same temperature for an additional two hours. Depending on the nitrogen heterocycle and the dialkyl sulfate employed, the quaternary ammonium compound may be either an oil or a crystalline solid. The yields are quantitative and the products are generally sufficiently pure that they can be used as such, without additional purification, for further reaction. Although an excess of either one of the reactants may be employed within the scope of this invention, the preferred embodiment employs a 1:1 molar ratio.

While the use of solvents which are chemically inert under the reaction conditions is within the scope of this invention, the preferred embodiment does not employ a solvent.

The reaction of the N-alkoxy quaternary compound with the cyanide salt of an anion exchanger can be carried out batchwise by adding a solution of the quaternary to a stirred suspension of the cyanide salt of the anion exchanger. When the reaction is complete, the reaction mixture is separated from the anion exchanger by decantation, filtration or centrifugation, and the so-formed cyano compound is isolated.

One preferred embodiment of this invention employs a column or bed of the cyanide salt of the anion exchanger, thus permitting the use of a semi-continuous process. Thus, a solution of the N-alkoxy quaternary compound can be passed through a bed of the cyanide salt of the anion exchanger and the product continuously removed and recovered. The passage of the solution is generally downwardly through the bed, and the effluent contains the product. The bed depth may be varied over wide limits, although too shallow a bed may require impractically slow flow rates to obtain a sufficient degree of conversion. When strong base exchanger has been depleted of cyanide ion, the flow of the solution of the quaternary compound is stopped, the column is rinsed with deionized water, and a 3 to 15% aqueous solution of a cyanide salt is passed through the column. When the strong base exchanger has been converted to the cyanide salt, the flow of cyanide solution is discontinued, the column rinsed free of salts with deionized water, and the flow of the solution of the quaternary compound is resumed.

A modification of the hereinbefore described column process which is continuous employs two columns in parallel. Both columns of strong base anion exchanger are originally in the cyanide salt form and the solution of the quaternary is passed through one column until the anion exchanger is depleted of cyanide ion. The flow of the quaternary compound is then diverted to the second column and the first column is re-converted to the cyanide form as set forth hereinbefore.

The reaction between the quaternary ammonium salt of the nitrogen heterocycle and the cyanide salt of an anion exchanger is exothermic, the degree of exothermicity depending on the specific nitrogen heterocycle involved. In the case of pyridine itself, the reaction is very exothermic and it is necessary to maintain the temperature of the reaction mixture at approximately 0° C. in order to control the reaction. On the other hand, some substituted pyridines react very sluggishly and the reaction mixture must be maintained at about 100° C. for completion. The broad temperature range for this reaction is from about −10° C. to 100° C. When using a columnar process, the exotherm can be controlled by regulating the flow rate of the solution of the quaternary, or external cooling or heating can be employed.

It is preferred to use an excess of cyanide in order to utilize the quaternary ammonium compound to best advantage. Thus, the molar ratio of the quaternary ammonium compound to the cyanide should be from about 1:1.5 to about 1:5. With the cyanide salt of the anion exchanger, these ratios are based on moles of cyanide ion available on the anion exchanger.

Although any solvent which will permit ionization of the cyanide and which is chemically inert under the reaction conditions can be employed, the preferred embodiments employ water or methanol, ethanol, or dioxane as a solvent. Of the two alcohols, methanol is preferred because the cyanides generally employed are more soluble in methanol. Particularly preferred is the use of aqueous solutions since the quaternary ammonium salts of the nitrogen heterocycles are soluble therein and the cyanide salt of the anion exchanger will readily supply cyanide ion in the presence of water. Aqueous methanol or ethanol solutions can also be used.

The reaction between the quaternary ammonium compound and the cyanide salt of the anion exchanger can be effected in the presence or absence of air or oxygen. In the preferred embodiment, the reaction is conducted in the absence of air by blanketing the reaction mixture with a blanket of inert gas, such as nitrogen. Oxygen or air can readily be excluded in a columnar type reactor.

As set forth hereinbefore, a large number of chemically diverse compounds can be prepared using the process of the present invention. Because of the great diversity of compounds possible, all the compounds which it is possible to make by the process of the present invention do not necessarily have the same utility. Thus, some are of interest as fungicides, some as ultraviolet stabilizers for polymers, and some as intermediates for the production of other valuable chemicals.

Two of the monocyano nitrogen heterocycles prepared by the process of the present invention were tested to determine their fungicidal activities. They were 1-cyanoisoquinoline and 2-cyanoquinoline, herein designated as compounds I and II respectively. The results of these tests are set forth in Table I. The test method employed is a commonly used test for determining fungitoxicity and the details are set forth in Phytopathology 33, 627–632 (1943). Typical fungi commonly employed to determine fungicidal activity are *Stemphylium sarcinaeforme* (S.s.) and *Monilinia fructicola* (M.f.), and these two fungi were used to obtain the data set forth in Table I. The dilute solutions for this test were prepared by dissolving 1 gram of each of the compounds in 20 cc. of acetone and then adding 79 cc. of water to make a 1% solution. This 1% solution was then diluted with water to form the 0.1% solution employed in the test. A spore suspension of *Monilinia fructicola* (M.f.) or *Stemphylium sarcinaeforme* (S.s.) in an amount of 0.5 cc. was added to 2.0 cc. of each of the 0.1% solutions and four drops of each of the resulting suspensions were pipetted onto individual glass slides which had been previously coated with cellulose nitrate. These slides were then placed in large Petri plates sealed with water and held at a constant temperature for 16 to 24 hours at which time the percentage of spores showing no germination was determined. This was done by counting 25 spores in the center of each of the four drops on each slide with the proper correction being made for non-viable spores as determined by the control (untreated) slides in each chamber. *Stemphylium sarcinaeforme* spore suspensions standardized to 5000 spores per cc. and *Monilinia fructicola* suspensions to 10,000 spores per cc. for use in this test. The values shown in Table I indicate satisfactory fungitoxicity.

TABLE I

| Compound | Concentration Of Solution, percent | Percent Inhibition Of Spore Germination | |
| --- | --- | --- | --- |
| | | M.f. | S.s. |
| I | 0.1 | 100 | 100 |
| II | 0.1 | 100 | 100 |

The products from the process of the present invention find wide utility in the synthesis of many valuable compounds. Because of the well-known reactivity of the cyano group, it is possible by simple well-known reactions to obtain, for instance, the corresponding amides, acids, esters or amines. Since it is possible to introduce more than one cyano group into the ring, poly-substituted nitrogen heterocycles containing the hereinbefore described derivatives from the cyano group can also be obtained.

The following examples set forth certain well-defined embodiments of the application of this invention. They are not, however, to be considered as limitations thereof, since many modifications may be made without departing from the spirit and scope of this invention.

Unless otherwise specified, all parts are parts by weight and all temperatures are centigrade unless otherwise noted.

A typical preparation of the cyanide salt of a strong base anion exchanger was as follows: 100 ml. (0.16 equivalent) of moist (approximately 50% moisture) anion exchanger beads in the chloride form were allowed to soak overnight in a solution of 20 grams (0.4 equivalent) of NaCN in 500 ml. of deionized water. The beads were removed from the solution by filtration and washed with deionized water until free of inorganic salt. The anion exchanger was prepared by suspension polymerizing a mixture of styrene and divinylbenzene (2% divinylbenzene), chloromethylating the resultant copolymer and then aminating with trimethylamine.

The cyanide salt of a resin prepared from a divinylbenzene-styrene copolymer chloromethylated and aminated with dimethylaminoethanol was made in a similar manner.

When using the column or continuous processes described hereinafter, the cyanide form of the anion exchanger can be prepared by the batch process described hereinbefore and then charged to the column. However, it is simpler to charge the chloride form of the anion exchanger, the form which is generally supplied commercially, and convert to the cyanide form by passing a 3 to 15% aqueous cyanide solution through the column.

In either the batch or column procedures for converting the anion exchanger to the cyanide salt form, any cyanide salt which supplies cyanide ion in aqueous solution can be used. The preferred salts are the alkali metal salts, including ammonium cyanide. Particularly preferred are sodium and potassium cyanide.

*Example I*

The beads (originally 100 ml. of anion exchanger in the cyanide form, prepared as set forth hereinbefore) were rinsed several times with a 50% aqueous ethanol solution. The beads were suspended by stirring in 100 ml. of the 50% aqueous ethanol, cooled to 0° C. in an ice bath, and then a solution of 25.8 grams (0.10 mole) of 1-methoxy-4-cyanopyridinium methyl sulfate dissolved in 200 ml. of 50% aqueous ethanol was added dropwise. When the addition was complete, the ice bath was removed and the mixture was stirred for one hour at room temperature. The mixture was then heated to 55° C. and the ion exchange resin beads were removed by filtration and washed with 50 ml. of warm ethanol. The combined filtrate was cooled in an ice bath and there separated 8.7 grams (75% theory) of 2,4-dicyanopyridine, melting 88–89° C.

In the preparation of this same compound by a homogeneous reaction, employing an aqueous potassium cyanide solution, the same compound was obtained in 54% yield, and had a melting point of 88° to 91° C. after being recrystallized from water. The increased purity and yield afforded by the process of the present invention are obvious.

*Example II*

Using the batch process as set forth in Example I, an equivalent quantity of 1-methoxyquinolinium methyl sulfate was substituted for 4-cyano-1-methoxypyridinium methyl sulfate. 2-cyanoquinoline, M.P. 93° to 94° C., was obtained in good yield.

*Example III*

An ion exchange column, equipped with a jacket for cooling or heating the column, was filled with a cyanide salt of an anion exchange resin as described in the section before Example I. The column was 5 cm. in diameter and 75 cm. in length. A solution of 50 grams 1-methoxypyridinium methyl sulfate in 750 ml. of 50% methanol-water was fed to the column at the rate of 250 ml. per hour. Cooling water was passed through the jacket so that the internal column temperature was about 10° C. The solvent was stripped from the effluent from the column and a mixture of 2-cyano and 4-cyanopyridines was obtained in a high degree of purity. At a flow rate of 250 ml. per hour, the cyanopyridine mixture was produced at the rate of 5.2 grams per hour.

When the yield of cyanopyridines in the effluent decreased due to the depletion of the cyanide salt of the anion exchanger, the flow of the quaternary solution was stopped, the resin column was rinsed with deionized water and then a 5 to 15% aqueous NaCN solution passed down therethrough to convert the resin to the cyanide salt form. After rinsing all salts from the column with deionized water, the flow of the quaternary solution was resumed.

*Example IV*

An alternate modification of the process described in Example III employs 2 columns as described in parallel. When the first column has been depleted by the passage of the quaternary solution, the flow of the quaternary solution is diverted to the second column so that the production of the cyanopyridines is substantially continuous. While the second column is being depleted, the first one is regenerated with aqueous NaCN solution.

These processes, or modifications thereof, can be readily scaled up to full plant scale.

*Example V*

A spool of a quaternary ammonium ion exchange fiber described in U.S. Patent 2,933,460 in the cyanide salt form wound upon a porous bobbin was placed in a standard package dyeing machine. A solution of 1-methoxyquinolinium methyl sulfate in dioxane (5%) was pumped through the machine so that the salt passed through the porous bobbin and then through the spool of fiber. The salt upon contacting the fiber was converted to 2-cyanoquinoline which was recovered in a high state of purity and in high yield by stripping the dioxane from the effluent from the package dyeing machine. In this way, 100 grams per hour of pure 2-cyanoquinoline was produced with a small laboratory model machine.

*Example VI*

Using the batch process as set forth in Examples I and II, an equivalent quantity of 2-methoxy isoquinolinium methyl sulfate was substituted for 4-cyano-1-methoxypyridinium methyl sulfate. 1-cyanoisoquinoline, M.P. 89° to 91° C., was obtained in good yield.

I claim:

1. A process for the introduction of cyano groups into the nucleus of a nitrogen heterocycle selected from the group consisting of pyridine, quinoline and isoquinoline, said pyridine having at least one of the 2, 4 and 6 positions available for substitution, said quinoline having available for substitution at least one of the 2 and 4 positions, said isoquinolines having the 1 position available for substitution, said nitrogen heterocycles having as substituents groups selected from the group consisting of 0 to 1 electrophilic groups selected from the group consisting of CN and COOR in which R is an alkyl group containing 1 to 8 carbon atoms, 0 to 3 substituents selected from the group consisting of alkoxy having 1 to 4 carbon atoms, alkyl having 1 to 8 carbon atoms, and aryl, which comprises reacting the N-alkoxy-quaternary inorganic salts in which the alkoxy group has 1 to 10 carbon atoms of said nitrogen heterocycles with the cyanide salt of a strong base anion exchanger at a temperature of from −10° to 100° C. and recovering the cyano derivative so formed.

2. A process as set forth in claim 1 in which the reaction between the N-alkoxy quaternary inorganic salt in which the alkoxy group has 1 to 10 carbon atoms and the cyanide salt of the anion exchanger is carried out in the presence of a solvent selected from the group consisting of water, methanol, ethanol, dioxane and mixtures thereof.

3. A process as set forth in claim 1 in which the reaction between the N-alkoxy quaternary inorganic salt in which the alkoxy group has 1 to 10 carbon atoms and the cyanide salt of the anion exchanger is carried out in the presence of water.

4. A process as set forth in claim 1 in which the cyanide salt of the strong base anion exchanger is the cyanide salt of an anion exchanger which is a tertiary amine-aminated, chloromethylated copolymer of a monovinylaromatic hydrocarbon and a polyvinylaromatic hydrocarbon.

5. A process as set forth in claim 1 in which the cyanide salt of the strong base anion exchanger is the cyanide salt of an anion exchanger which is a tertiary amine-aminated, chloromethylated copolymer of styrene and divinylbenzene, said copolymer containing from 1 to 10% divinylbenzene.

6. A process as set forth in claim 1 in which the cyano derivative is produced in a semi-continuous process by reacting the N-alkoxy quaternary inorganic salts of the nitrogen-containing heterocycles by passing a solution of said quaternary salt through a column of the cyanide salt of a strong base anion exchanger and isolating the cyano compound from the column effluent.

7. A process as set forth in claim 6 in which two columns of the cyanide salt of a strong base anion exchanger are employed in parallel, the solution of said quaternary salt being passed through one column until the column is exhausted of cyanide ion, switching the flow of the solution of said quaternary salt to the second column and regenerating the first column by passing an aqueous solution of a cyanide through said first column.

References Cited in the file of this patent

UNITED STATES PATENTS 2,943,091    Cislak _____ June 28, 1960